Dec. 15, 1931.                W. W. MOHR                1,836,384
         SCREWED AND WELDED FLANGES FOR FORGED STEEL
              VALVES AND METHOD OF MAKING THE SAME
                       Filed Oct. 20, 1930
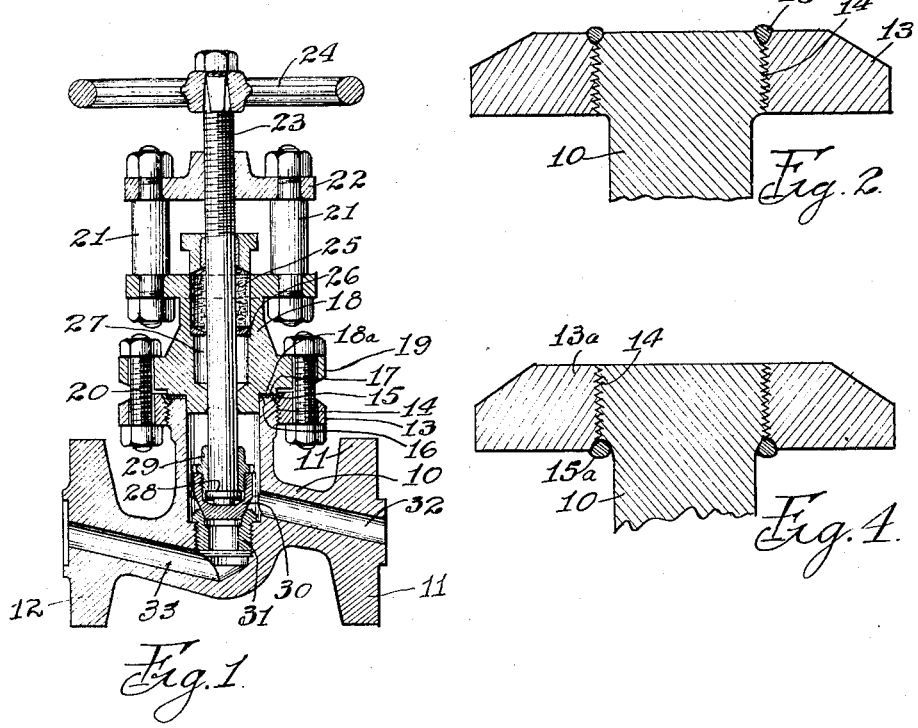
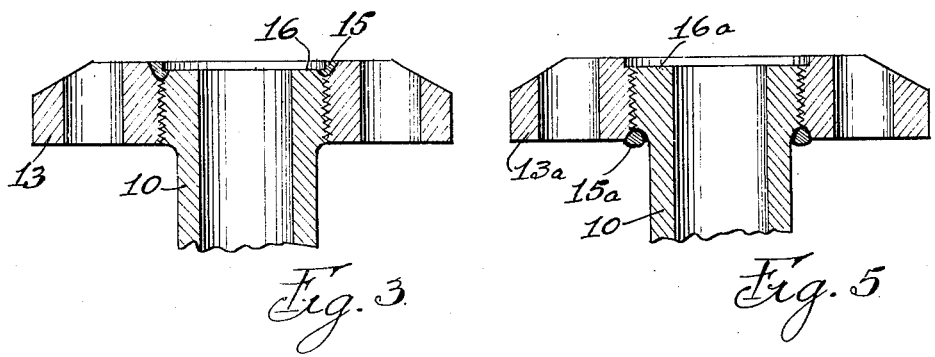
INVENTOR.
WALTER W. MOHR
BY Albert C. Bell
    ATTORNEY.

Patented Dec. 15, 1931

1,836,384

UNITED STATES PATENT OFFICE

WALTER W. MOHR, OF CHICAGO, ILLINOIS, ASSIGNOR TO THE EDWARD VALVE AND MANUFACTURING COMPANY, OF EAST CHICAGO, INDIANA, A CORPORATION OF ILLINOIS

SCREWED AND WELDED FLANGES FOR FORGED STEEL VALVES AND METHOD OF MAKING THE SAME

Application filed October 20, 1930. Serial No. 489,785.

My invention relates to an improved method of joining the flanges and bodies of forged steel valves for use with fluids under high pressure and temperature, by screw threads and welding, so that the flanges thus secured to the bodies will have ample strength for all practical requirements in use, and at the same time will avoid all difficulty that might result from having the joints in the fluid pressure area, as well as joints of the kind referred to, which, by the finishing of the parts to facilitate connection with other parts of the valve or piping, may afford a ready means for determining the quality of the welds made between the flanges and the valve bodies.

Forged steel valves of the kind referred to, are frequently required to control the flow of fluids under high pressure, for example from nine hundred pounds per square inch to thirteen hundred and fifty pounds per square inch or higher, with correspondingly high temperatures of the fluid. The only practical constructions that will meet these extreme working requirements, are valves in which the bodies are forged from steel by means of suitable dies, the resulting blanks being solid and the necessary compartment for the valve mechanism per se, and the passages for fluid flow, being subsequently formed in the solid blank by drilling operations in connection with finishing the body blank for use. The connections between valves of this kind and the pipes connected with them, and between the parts of the valve housing, for example between the valve body and the valve bonnet, must be flange connections in order to withstand the high fluid pressures employed. As a result, where the valve is of the globe type, two parallel end flanges are required for connecting the pipes to the valve body, and a third flange usually at right angles or substantially so to the end flanges is required to secure the valve bonnet to the valve body. In attempting to forge valve bodies with three integral flanges as described, serious practical difficulties are encountered among which may be mentioned the amount of draft required in the dies for the flanges, which may run for example from seven and one-half to ten degrees and thus necessitate a much greater amount of metal in the valve body than is required for strength in the finished valve; also the difficulty of securing proper fiber directional flow of the metal in the dies in forging the valve bodies, without looping effects, with consequent uncertainty as to the strength of the resulting forged bodies; also the excessive wear of the forming dies and the necessity of frequently changing the trimming dies to take care of that wear; also, frequent reheating of the blank is required during its forming. As a result, the production of the finished product is attended with prohibitive cost. These difficulties do not occur to a prohibitive extent, where the end flanges only, are made integral with the valve body. A further difficulty where the three flanges are integral with the valve body, is the difficulty and cost of finishing the backs of the flanges on account of the small clearances involved, to receive the fastening bolts used with the flanges.

By my invention I provide screwed and welded joints between flanges and valve bodies of the kind described, by a method that not only provides the flange connection with the requisite strength to serve its intended purpose, and locates the screwed and welded joint outside of the fluid pressure area to meet the requirements of present standards concerning such structures, but in addition, the location of the joint is such that in machining the bodies and flanges to form gasket seats for connected parts, the machining extends part way into and through the welding material, so that the same operation will produce a gasket seat and disclose the internal structure of the welding material at any joint, making inspection of the internal structure of the weld a simple matter, which is of importance on account of the effectiveness of a weld being impossible of determination from external examination, and determinable only by an examination of the internal structure of the welding material as to uniformity of metal distribution and homogeneity of the weld material.

My invention will best be understood by reference to the accompanying drawings, illustrating a preferred embodiment thereof, in which Fig. 1 shows in vertical, central, sectional view a forged steel valve provided with a bonnet flange in accordance with my invention, Fig. 2 shows in a view similar to Fig. 1 and to an enlarged scale, the upper part of a valve body blank after the bonnet flange has been secured thereto by screwing and welding, Fig. 3 shows in a view similar to Fig. 2, the parts illustrated in Fig. 2 after they have been machined, Fig. 4 shows in a view similar to Fig. 2 a different location of the welding material, and Fig. 5 shows in a view similar to Fig. 3 the parts illustrated in Fig. 4 after they have been machined.

Similar numerals refer to similar parts throughout the several views.

As shown in Fig. 1, I illustrate a forged steel valve having a body 10 provided with integral end flanges 11 and 12 and a bonnet flange 13 screwed on the upper end of the body at 14, the joint being welded at 15 preferably by electric welding to the end that the heat of welding is localized and danger of loosening the screw joint by the welding operation is reduced to a minimum. The upper end of the body 10 is provided with a shouldered seat 16 extending into the welding material 15, to receive a gasket 17 and a stepped portion 18a of the bonnet 18, the lower end of the bonnet being provided with a flange 19 connected by bolts 20 with the flange 13 to hold the bonnet in place on the upper end of the valve body 10. The bonnet 18 has extending therefrom pillars 21 supporting a yoke 22 above the upper end of the bonnet, said yoke being threaded to engage the externally threaded valve stem 23 which carries on its upper end a hand wheel 24. The bonnet is provided with a stuffing box 25 resting against a metal ring 26 at its lower end, held in place by a shoulder in the bore in the bonnet 18, leaving a condensation chamber 27 below the stuffing box. The lower end of the valve stem 23 carries a collar 28, above which a sleeve 29 is loosely supported on the stem and provided with external threads at its lower end to receive the internal threads of the valve member 30 which loosely surrounds the collar 28. The valve member 30 cooperates with a valve seat 31 threaded into a bore therefor in the body 10, which is coaxial with the stem 23. A first passage for fluid flow 32, extends through the flange 11 and into the vertical bore of the body 10 just above the valve seat 31 and a second passage 33 extends through the flange 12 and into the lower end of the vertical bore in the body 10 just below the valve seat 31. The various bores in the body 10 are drilled and finished after the blank of the body is formed by forging in suitable dies.

In Fig. 2 I illustrate the upper end of the body 10 in the condition that it leaves the forging and trimming dies, excepting that it has been provided with external screw threads at 14 upon which the bonnet flange 13 has been screwed and the welding material 15 has been put in place at the upper end of the joint in a groove provided for the purpose, and preferably by means of electric welding, uniting the body and flange.

In Fig. 3 I illustrate the parts shown in Fig. 2 after the body and flange have been machined, a part of the machining consisting in forming the shouldered seat 16 on the upper end of the body 10, this seat being in the nature of a counterbore extending into and partly through the welding material 15, so that the screwed and welded joint is at the external edge of the gasket and out of the fluid pressure area. The upper surface of the flange 13 is also machined to present a uniform surface to the lower surface of the bonnet flange. This exposes the internal structure of the welding material 15 so that any defects and any lack of uniformity in the welding material may be observed.

In the construction shown in Fig. 4, the upper end of the body portion 10 is provided with screw threads 14 as above described to receive the bonnet flange 13a, but in this case the welding material 15a is located at the lower end of the joint instead of at its upper end as shown in Figs. 2 and 3.

In Fig. 5, the parts illustrated in Fig. 4 are shown in machined condition, but in this case the shouldered seat 16a extends at its outer edge across the threaded connection between the body 10 and the flange 13a and does not enter the welding material 15a, and the welding material 15a may remain in its original condition unless specially machined to test its internal structure. While the construction shown in Figs. 4 and 5 is effective in many cases, it is open to the objection that the structure of the welding material is not disclosed as a result of machining the parts to receive the additional parts of the valve structure, and it is open to the further objection that the screw threads are not as completely protected from fluid that may seep under the gasket, as with the structure shown in Figs. 2 and 3.

It will be understood that the particular valve structure shown in Fig. 1 is illustrative of but one construction with which my invention may be employed and that I do not limit myself to this particular form of valve structure. It will also be observed that my improved type of flange connection may be applied in any case where integral flanges are impracticable with forged valves, and that my improved method of connecting flanges and valve bodies is applicable to any construction of the kind referred to.

My improved method consists essentially of forming a screw joint between a flange and a valve body adjacent the outer portion of a gasket seat and outside of the fluid pressure area, welding the flange and body together thereby uniting them, and counter-boring the valve body to form a gasket seat and more specifically, locating the welding material at the gasket end of the joint and extending the counterbore into the welding material, whereby the counterbore may be made to accurately fit the parts to be connected with the valve body and at the same time disclose the internal structure of the welding material.

While I have shown my invention in the particular embodiment above described, it will be understood that I do not limit myself to the particular structure and steps of operation set forth, as I may employ equivalents known to the art at the time of filing this application without departing from the scope of the appended claims.

What I claim is:

1. In a forged steel valve, the combination of a forged steel body having integral pipe connection flanges and an extension to support a bonnet, a bonnet connecting flange screw-threaded on said extension, and welding material uniting said extension and said bonnet connecting flange at one end of said screw-threads outside of the fluid pressure area.

2. In a forged steel valve, the combination of a forged steel body having integral pipe connection flanges and an extension to support a bonnet, a bonnet connecting flange screw-threaded on said extension, and welding material uniting said extension and said bonnet connecting flange at one end of said screw-threads outside of the fluid pressure area, said welding material being at the outer end of said extension.

3. In a forged steel valve, the combination of a forged steel body having integral pipe connection flanges and an extension to support a bonnet, a bonnet connecting flange screw-threaded on said extension, and welding material uniting said extension and said bonnet connecting flange at one end of said screw-threads outside of the fluid pressure area, said welding material being at the outer end of said extension and the outer end of said extension having a gasket seat extending into said welding material.

4. In a forged steel valve, the combination of a forged steel body having integral pipe connection flanges and an extension to support a bonnet, a bonnet connecting flange screw-threaded on said extension, and welding material uniting said extension and said bonnet connecting flange at one end of said screw-threads outside of the fluid pressure area, said welding material being at the outer end of said extension, and the outer end of said extension having a gasket seat extending into and provided with a shoulder consisting of said welding material.

5. In a forged steel valve, the combination of a forged steel body having integral pipe connection flanges and an extension to support a bonnet, a bonnet connecting flange screw-threaded on said extension, and welding material uniting said extension and said bonnet connecting flange.

6. In a forged steel valve, the combination of a forged steel body having integral pipe connection flanges and an extension to support a bonnet, a bonnet connecting flange screw-threaded on said extension, and welding material uniting said extension and said bonnet connecting flange, said welding material being at the outer end of said extension.

7. In a forged steel valve, the combination of a forged steel body having integral pipe connection flanges and an extension to support a bonnet, a bonnet connecting flange screw-threaded on said extension, and welding material uniting said extension and said bonnet connecting flange, said welding material being at the outer end of said extension and the outer end of said extension having a gasket seat extending into said welding material.

8. In a forged steel valve, the combination of a forged steel body having an extension to support a flange, a flange screw-threaded on said extension, and welding material uniting said extension and said flange at one end of said screw-threads outside of the fluid pressure area.

9. In a forged steel valve, the combination of a forged steel body having an extension to support a flange, a flange screw-threaded on said extension, and welding material uniting said extension and said flange at one end of said screw-threads outside of the fluid pressure area, said welding material being at the outer end of said extension.

10. In a forged steel valve, the combination of a forged steel body having an extension to support a flange, a flange screw-threaded on said extension, and welding material uniting said extension and said flange at one end of said screw-threads outside of the fluid pressure area, said welding material being at the outer end of said extension and the outer end of said extension having a gasket seat extending into and provided with a shoulder consisting of said welding material.

11. In a forged steel valve, the combination of a forged steel body having an extension to support a flange, a flange screw-threaded on said extension, and welding material uniting said extension and said flange.

12. In a forged steel valve, the combination of a forged steel body having an extension to support a flange, a flange screw-threaded on said extension, and welding material uniting said extension and said flange, said welding material being at the outer end of said extension.

13. In a forged steel valve, the combination of a forged steel body having an extension to support a flange, a flange screw-threaded on said extension, and welding material uniting said extension and said flange, said welding material being at the outer end of said extension and the outer end of said extension having a gasket seat extending into said welding material.

14. The method of providing forged steel valve bodies with flanges, consisting of externally screw-threading an extension of such a body, screwing a flange on said extension, uniting said extension and flange by welding material, and making a gasket seat on said extension and extending into said welding material.

15. The method of providing forged steel valve bodies with flanges, consisting of securing an extension of such a body to a flange by screw-threads, uniting said parts by welding, and tooling a gasket seat on said extension into said weld.

16. The method of providing forged steel valve bodies with flanges, consisting of mounting a flange on such a body by screw threads outside of the pressure area, uniting the parts by welding, and tooling a gasket seat on said parts into said weld.

In witness whereof, I hereunto subscribe my name this 14th day of October, A. D. 1930.

WALTER W. MOHR.